United States Patent
Ersoy et al.

(10) Patent No.: US 7,762,736 B2
(45) Date of Patent: Jul. 27, 2010

(54) BALL AND SOCKET JOINT WITH SENSOR DEVICE AND PROCESS FOR WEAR MEASUREMENT

(75) Inventors: Metin Ersoy, Walluf (DE); Joachim Spratte, Osnabrück (DE); Michael Klank, Osnabrück (DE); Peter Hofmann, Gauting (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 162 days.

(21) Appl. No.: 11/917,367

(22) PCT Filed: Jun. 14, 2006

(86) PCT No.: PCT/DE2006/001019

§ 371 (c)(1),
(2), (4) Date: Dec. 13, 2007

(87) PCT Pub. No.: WO2006/133682

PCT Pub. Date: Dec. 21, 2006

(65) Prior Publication Data

US 2009/0136288 A1 May 28, 2009

(30) Foreign Application Priority Data

Jun. 15, 2005 (DE) .................. 10 2005 027 826

(51) Int. Cl.
*F16C 11/08* (2006.01)
(52) U.S. Cl. .................. 403/122; 403/132; 403/133
(58) Field of Classification Search .................. 403/122, 403/128, 132, 133, 135
See application file for complete search history.

(56) References Cited

U.S. PATENT DOCUMENTS

| 3,817,640 | A | 6/1974 | Carter et al. |
| 6,577,119 | B1 * | 6/2003 | Yaddehige ............... 324/207.2 |
| 6,773,197 | B2 * | 8/2004 | Urbach ...................... 403/135 |
| 6,840,697 | B1 * | 1/2005 | Dorr .......................... 403/133 |
| 7,048,461 | B2 * | 5/2006 | Williams ................... 403/135 |
| 2004/0067096 | A1 * | 4/2004 | Ersoy et al. ................. 403/137 |

FOREIGN PATENT DOCUMENTS

| DE | 101 07 279 A1 | 8/2002 |
| DE | 101 40 683 A1 | 3/2003 |
| DE | 101 61 671 A1 | 6/2003 |
| DE | 103 41 466 A1 | 4/2005 |
| DE | 103 47 814 B4 | 5/2005 |

(Continued)

*Primary Examiner*—Michael P Ferguson
(74) *Attorney, Agent, or Firm*—McGlew and Tuttle, P.C.

(57) ABSTRACT

A ball and socket joint is provided for a motor vehicle that has a joint housing (1), in the interior space of which a ball shell (2) is arranged. The ball (3) of a ball pivot (4) is accommodated in the ball shell (2). A sensor device (7), for measuring forces and loads, is arranged on a flexurally elastic printed circuit board (6). The printed circuit board is fastened in the joint housing (1) in a flexurally mobile manner. The sensor device (7) measures deflections and mechanical stresses of the sensor printed circuit board (6). A transmission device introduces forces or a bending moments into the sensor printed circuit board (6) in case of a deformation of the ball shell (2). The process makes possible the permanent determination of the state of wear of the ball and socket joint via measurement of the prestressing force of the ball shell.

17 Claims, 3 Drawing Sheets

FOREIGN PATENT DOCUMENTS

| | | | | |
|---|---|---|---|---|
| EP | 1 400 712 A2 | 3/2004 | | |
| JP | 62 132020 | 6/1987 | | |
| JP | 63-125816 | * 5/1988 | ................ | 403/122 |
| JP | 63-125816 | * 6/1988 | ................ | 403/120 |
| JP | 63-130912 | * 6/1988 | | |
| JP | 63-293318 | * 11/1988 | ................ | 403/27 |
| WO | WO 03/052284 A1 | 6/2003 | | |
| WO | WO 2005/021295 A1 | 3/2005 | | |

* cited by examiner

BALL AND SOCKET JOINT WITH SENSOR DEVICE AND PROCESS FOR WEAR MEASUREMENT

CROSS REFERENCE TO RELATED APPLICATIONS

This application is a United States National Phase application of International Application PCT/DE2006/001019 and claims the benefit of priority under 35 U.S.C. §119 of German Patent Application DE 10 2005 027 826.4 filed Jun. 15, 2005, the entire contents of which are incorporated herein by reference.

FIELD OF THE INVENTION

The present invention pertains to a ball and socket joint with a sensor device, for example, for an axle system or a wheel suspension of a motor. Furthermore, the present invention pertains to a process for wear measurements on a ball and socket joint.

BACKGROUND OF THE INVENTION

Ball and socket joints of the type mentioned in the introduction are used, for example, but by no means exclusively, at the chassis or at the wheel suspension of motor vehicles, e.g., as a support joint or as a guiding joint. Ball and socket joints of this class comprise a sensor device, with which forces and loads acting on the ball and socket joint can be determined or measured.

Ball and socket joints of the type mentioned in the introduction with means for measuring forces and loads are used, for example, on the motor vehicle in order to make it possible to reliably determine there the forces or bending moments acting on the ball and socket joint during the real driving operation or even during testing operation on the test bench. Such measurements of forces on ball and socket joints in the area of the chassis of a motor vehicle make it possible to infer the dynamic state of a motor vehicle. It is thus possible to achieve, in particular, an improvement of the data base for driving safety systems, for example, ESP or ABS. Ball and socket joints of this class are thus used, among other things, to improve the driving safety of the motor vehicle.

A ball and socket joint with force sensor device is known, for example, from DE 101 07 279 A1. The ball and socket joint known from this document is used especially to determine or analyze the force acting in a certain component of a motor vehicle, for example, the axial force present in a tie rod because of forces of reaction from the chassis. According to the teaching of this document, provisions are made for this, among other things, for providing a ball and socket joint arranged between different components of the steering linkage with wire strain gauges or piezo pressure pick-ups in the area of the ball pivot and to infer the load on the ball and socket joint and hence the axial forces acting in the steering linkage on the basis of the signals of these sensors.

However, the equipping of ball and socket joints with such wire strain gauges or piezo sensors is associated with a rather substantial effort. At first, a corresponding surface must be created for arranging these components, mostly at the ball pivot, to which, for example, the wire strain gauge must then be bonded. In addition, an electric wire connection must also be established to a separate electronic analysis unit, and the electronic analysis unit must be arranged, in addition, at a suitable site in a protected manner. On the whole, this leads to a complicated and hence expensive manufacture of such ball and socket joints provided with load sensors, and, moreover, the exposed sensor system and wiring of such ball and socket joints are sensitive and therefore threatened by failures.

In addition, it is hardly possible in the prior-art ball and socket joints with force sensor device to derive additional information on the state especially of the ball and socket joint by means of the force sensor device beyond the load situation proper of the ball and socket joint. However, since ball and socket joints arranged in the area of the chassis or the steering of motor vehicles are safety-relevant components, whose failure may lead to fatal consequences especially during driving, it is especially desirable to make it also possible to permanently obtain information on the instantaneous operating state or state of wear of the ball and socket joint.

SUMMARY OF THE INVENTION

Against this background, the object of the present invention is to provide a ball and socket joint with a sensor device, with which the drawbacks of the state of the art can be overcome. In particular, the ball and socket joint shall make it possible to determine forces and loads acting on the ball and socket joint at a low cost and in a reliable manner as well as with a high degree of freedom in terms of design. In addition, it shall also be possible to obtain information on the state of wear of the ball and socket joint, so that a possibly imminent failure of a ball and socket joint can be recognized and thus prevented in time.

The ball and socket joint according to the present invention comprises, at first, in a manner known per se, a joint housing. The joint housing has a mostly essentially cylindrical interior space, in which the ball shell of the ball and socket joint is arranged. The ball of the ball pivot of the ball and socket joint is accommodated in the ball shell in a slidingly movable manner.

In a manner that is likewise known per se, the ball and socket joint comprises, furthermore, a sensor device for measuring forces and loads of the ball and socket joint. However, the ball and socket joint is characterized according to the present invention in that the force sensor device is arranged on a flexurally elastic printed circuit board. The printed circuit board is located within the joint housing and is arranged there in a flexurally mobile manner such that it can be exposed—essentially unhindered by other components—to a certain deflection. The force sensor device on the printed circuit board is designed such that deflections or mechanical stresses can be detected or measured by means of the force sensor device. The ball and socket joint comprises, furthermore, transmission means, which are set up such that a force or a bending moment can be introduced into the flexurally elastic printed circuit board during a deformation of the ball shell.

In other words, this means that forces acting on the ball and socket joint are detected according to the present invention due to the fact that the deformation of the mostly elastic ball shell, which always develops due to the forces, is transmitted to an elastic printed circuit board arranged within the joint housing by means of a transmission means. A sensor device, with which the mechanical stresses introduced into the printed circuit board or the deflections of the printed circuit board, which are caused thereby, can be measured, is arranged on the printed circuit board.

Thus, if an external load acts on the ball and socket joint, the shape of the ball shell, which usually consists of a viscoplastic polymer, will inevitably also change at least slightly. This change in shape is passed on via the transmission means of the ball and socket joint to the flexurally elastic printed circuit board and detected by the sensor arranged there.

The arrangement of the printed circuit board with the sensor device according to the present invention in a well-protected manner within the joint housing is advantageous as well. This leads to a construction that is both very robust and inexpensive, because a complicated separate arrangement of sensors and subsequent wiring with the electronic analysis unit is no longer necessary, and the sensor system and the electronic analysis unit can rather be integrated together on the printed circuit board. Mechanical changes, which could compromise the stability of the ball and socket joint, are no longer necessary on the ball pivot or on the joint ball, either. The costs that have hitherto been associated herewith can be eliminated as well.

Furthermore, besides forces that act on the ball and socket joint from the outside, it is additionally also possible to obtain information on internal forces acting within the ball and socket joint thanks to the principle of measurement according to the present invention. One can think in this connection, in particular, of the detection of the prestressing/pretensioning force of the ball shell, whose value, decreasing over time, can be used as an indicator of the increasing wear of the ball and socket joint.

The design and the arrangement of the sensor printed circuit board or of the means for transmitting the deformations of the ball shell to the sensor printed circuit board are at first irrelevant for the embodiment of the present invention. However, the sensor printed circuit board is round or the transmission means is formed by an essentially circumferential projection of the ball shell according to especially preferred embodiments of the present invention.

This is advantageous because a nearly unidirectional detection of forces can thus take place, because practically all occurring deformations of the ball shell are reliably transmitted to the sensor printed circuit board via the projection extending circumferentially in a ring-shaped pattern. In particular, any desired force acting on the ball and socket joint in the x and y directions can thus be detected, the z direction being defined along the axis of the ball pivot or of the joint housing. However, the prestressing/pretensioning forces acting essentially unidirectionally in the ball shell and even any external compressive forces acting on the ball and socket joint in the z direction can thus be additionally recorded or measured as well. In addition, the (greatly variable) external joint forces can also be reliably distinguished from the only comparatively slowly changing internal prestressing/pretensioning forces acting within the joint with a suitable connection of the electronic analysis unit.

According to another, likewise especially preferred embodiment of the present invention, the force sensor device is designed for measuring both the value and the direction of the deformation or deflection of the sensor printed circuit board. In other words, this means that the sensor device arranged on the sensor printed circuit board is designed such that the direction of the deflection or the direction of the bending moments causing the deflection can also be detected in the x-y plane, beside the intensity of the deflection of the sensor printed circuit board.

In addition to the value of an external force acting on the ball and socket joint, the direction of action of that force or at least the projection of the direction in which the force acts onto the x-y plane of the ball and socket joint can be detected in this manner as well.

The fact that not only is the value of forces acting on a ball and socket joint measured but the direction of those forces is also detected provides especially valuable data, for example, in case of the use of the ball and socket joint in a motor vehicle with driver assistance systems such as ABS or ESP. However, ball and socket joints of such a design can also be used with great advantage, for example, in testing operations on a test bench or during real test drives in order to make it possible to determine exact data on the actual state of load of the ball and socket joints or of the particular axle system of a motor vehicle.

The present invention is also embodied at first independently from how the sensor printed circuit board is arranged in the joint housing or how it is connected to the joint housing. However, according to preferred embodiments of the present invention, the sensor printed circuit board can be brought into contact with a support element arranged circumferentially at the joint housing, the support element being formed preferably by a spacer ring, whose diameter differs from the diameter of the circumferential projection of the ball shell.

A scissor-like clamping action is exerted in this manner circumferentially on the sensor printed circuit board due to the cooperation of the support element and the transmission means. Both a force acting externally on the ball and socket joint with any desired direction of force in the x-y plane and the prestressing/pretensioning force of the ball shell, which force is present in the ball and socket joint, can thus be reliably determined. The transmission ratio between the deformations of the ball shell and the deflections of the sensor printed circuit board or the sensitivity of the sensor device, which depends thereon, can now be set especially by correspondingly setting, in a variable manner, the diameter ratios of the spacer ring and the circumferential transmission means and/or by changing the modulus of elasticity or the flexural stiffness of the sensor printed circuit board within broad limits.

According to other preferred embodiments of the present invention, the spacer ring can be brought into contact with the housing cover of the ball and socket joint, or the spacer ring is made in one piece with the housing cover of the ball and socket joint. This leads to a simple and robust design of the ball and socket joint and to the effective introduction of the bending moments necessary for the measurement into the sensor printed circuit board.

According to an alternative embodiment of the present invention, the sensor printed circuit board can be brought into contact with a support element, which is not connected to the joint housing, but rather likewise to the ball shell. This embodiment may offer an even higher sensitivity of force measurement, depending on its geometric shape. In addition, this embodiment makes possible the especially simple mounting of the sensor printed circuit board directly or indirectly on the ball shell.

According to another, especially preferred embodiment of the present invention, the ball and socket joint is characterized, furthermore, by an angle sensor device for determining the relative angular position of the joint housing and the ball pivot. The angle sensor device has a field transducer arranged in the area of the surface of the joint ball, especially a permanent magnet, as well as a field sensor device arranged at the joint housing, especially a magnetic field sensor.

It is thus also possible, furthermore, to determine the instantaneous relative angular position of the joint housing and the ball pivot of one and the same ball and socket joint, in addition to the joint forces that can be measured by means of the force sensor device. It is thus possible, for example, to expand the data base for driving safety or driver assistance systems of a motor vehicle even further, as a result of which additional improvements can be achieved in the driving safety of motor vehicles thus equipped.

According to other preferred embodiments, the field sensor device is arranged together with the force sensor device on the sensor printed circuit board, and the field sensor device and the force sensor device are preferably designed in the form of a monolithically integrated circuit. A ball and socket joint in which it is possible to measure both forces and angular positions can thus be manufactured at an extremely low cost and at the same time in a reliable and robust manner. The fact that field sensor device that integrate both a possibility of measurement for magnetic fields in the three-dimensional space and additional force and deformation sensors for the x and y directions on one and the same monolithic circuit is favorable for this embodiment of the present invention.

In addition, both the sensors and the analysis circuits and optionally also the digitization as well as circuits for the preliminary processing of the measured values can be integrated in this manner on one and the same sensor printed circuit board, which is likewise favorable for the reliability, the low-cost manufacturability and the universal usability of a ball and socket joint of such a design.

According to other preferred embodiments of the present invention, the field sensor device is designed as a CMOS Hall sensor array or is designed for measuring fields in all three directions of space. On the one hand, a CMOS Hall sensor can be manufactured at an especially low cost and permits integration with the analysis circuits in a comparatively simple manner.

A ball and socket joint with a field sensor device, which can detect fields in all three directions of space, which consequently can, in other words, detect the density as well as the direction of the field lines independently from the orientation of these field lines in the three-dimensional space, has special advantages, because it is possible in this manner to determine in a ball and socket joint both angle components of the tilt and pivot angle, which is composed of an x component and a y component, as well as the angle of rotation or the twisting of the ball pivot about its own axis. The additional measurement of the angle of rotation of the ball pivot provides additional information, which can be used, for example, for driving safety systems on the motor vehicle, such as for ABS and ESP, but, for example, also for applications such as the automatic headlight leveling control of the main headlights and the like.

The present invention pertains, furthermore, to a process for wear measurement on a ball and socket joint. The process according to the present invention is used to determine the residual prestressing/pretensioning force still present as a percentage of the prestressing/pretensioning force of the ball shell in the joint housing, which was originally set during the manufacture of the ball and socket joint, after a certain operating time of the ball and socket joint.

The ball shell of a ball and socket joint is manufactured mostly of a viscoplastic polymer and is subject to both superficial wear because of the relative motion between the ball surface and the ball shell and to a certain relaxation because of creeping motions of the plastic in the course of the service life of the ball and socket joint. Both contribute to a decline in prestress in the ball and socket joint over time, as a result of which the clearance of the joint may also increase, especially under load.

The value of the prestressing/pretensioning force, which decreases over time, can therefore be used as an indicator of the instantaneous state of the still remaining service life of a ball and socket joint. Furthermore, damage to the ball and socket joint, for example, a damaged sealing bellows, with the subsequent entry of, e.g., corrosive salt water into the ball and socket joint, can be inferred from a great decline in the prestressing/pretensioning force which occurs within a short time in a ball and socket joint.

To carry out the process according to the present invention, a check is first performed in a first process step to determine whether one or more of the conditions "constancy of force or load during standstill of the ball and socket joint," "suitable relative position of the ball pivot in the joint housing" or "absence of motion of the ball and socket joint or of the motor vehicle" are present.

The more of these conditions are met, the more reliably and accurately can subsequent measurement be performed.

The value of the prestressing/pretensioning force between the ball shell and the joint housing or between the ball shell and the joint ball is subsequently determined in another process step by means of the force sensor device of the ball and socket joint. The value of the wear of the ball and socket joint, which value corresponds to the measured signal or the prestressing/pretensioning force determined, is subsequently calculated from the measured signal or from the prestressing/pretensioning force determined in another process step.

Finally, the wear value determined is compared to a stored maximum wear value, and a warning is sent if the maximum is ever exceeded.

Reliable information can thus be obtained by the process according to the present invention on the state of the ball and socket joint as well as on the foreseeable remaining service life of the ball and socket joint. A possibly imminent failure of the ball and socket joint can also be detected or predicted in time thanks to the monitoring of the prestressing/pretensioning force or of the wear value of the ball shell according to the present invention. The reliability of operation of a ball and socket joint or of a motor vehicle equipped therewith can thus be decisively improved.

The present invention will be explained in more detail below on the basis of embodiments, which are only exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
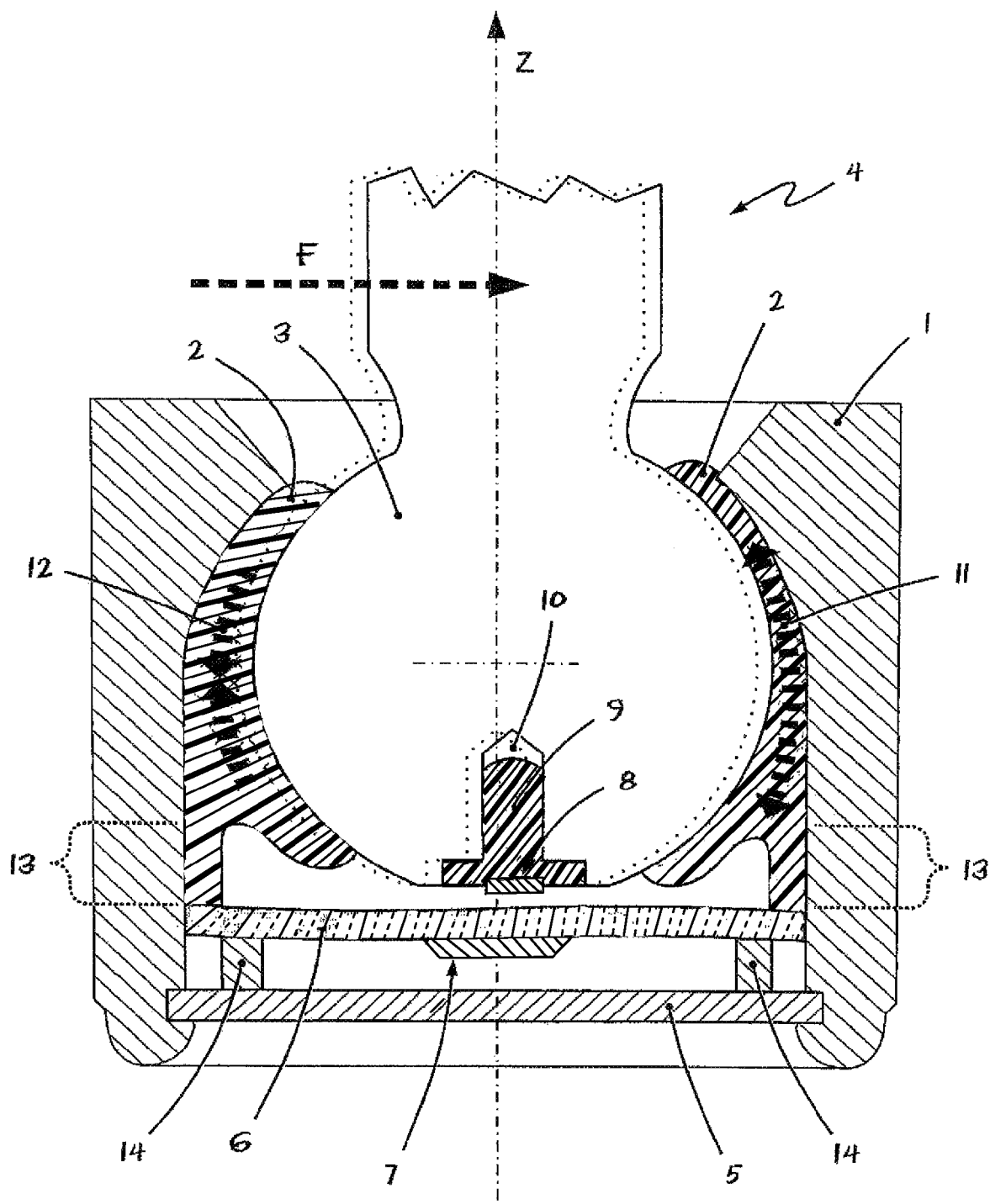
FIG. 1 is a schematic view of an embodiment of a ball and socket joint according to the present invention with lateral admission of forces in a longitudinal section.

Referring to the drawings in particular, FIG. 1 shows, in a schematic longitudinal view, an embodiment of a ball and socket joint according to the present invention. The essentially pot-shaped joint housing 1 with the bearing shell or ball shell 2 arranged therein is recognized. The ball 3 of a ball pivot 4 is, in turn, arranged in the interior space of the ball shell 2.

The ball and socket joint according to FIG. 1 has, furthermore, a sensor printed circuit board 6 arranged between the joint ball 3 and the housing cover 5. A sensor device 7, indicated only schematically, is arranged on the sensor printed circuit board 6. The sensor device 7 is located in the vicinity of a magnetic field transducer 8, which is designed as a permanent magnet and is arranged in a hole 10 of the joint ball 3 by means of a plastic plug 9.

The sensor device 7 is designed such that it can detect the field of the permanent magnet 8 in all three directions of space; in other words, it can consequently vectorially detect the field density as well as the direction of the field lines independently from the orientation thereof in the three-dimensional space. Thus, both the pivot angle of the ball pivot 4 in the joint housing 1 and additionally also the orientation of the plane spanned by the pivot angle can be determined.

In other words, it is consequently possible to determine the amount as well as the direction of the pivoting of the ball pivots 4 relative to the joint housing 1. However, since the sensor device 7 can vectorially determine the amount and the direction of the field lines of the permanent magnets 8 in the three-dimensional space, the amount of the angle of rotation by which the ball pivot 4 was rotated or twisted within the joint housing 1 can be additionally determined as well.

The measurement of both the pivot angle in terms of amount and direction and of the amount of the angle of rotation with a single sensor device 7 consequently offers an extremely broad data base in a simple and reliable manner, for example, in the testing operation, or also for driving safety and driver assistance systems of a motor vehicle equipped with the ball and socket joint according to the present invention.

Both the field sensors proper and the corresponding electronic analysis unit as well as additional circuit components, for example, digitization or data bus connection, can be accommodated in the area of the sensor device 7 or on one and the same printed circuit board 6 at a low cost, in a compact and protected manner.

However, the ball and socket joint according to FIG. 1 also has the ability of measuring and monitoring both the operating forces acting on the ball and socket joint and the remaining prestressing/pretensioning force of the ball shell 2 in the joint housing, in addition to the possibilities of measuring the pivot angle and the angle of rotation.

It can be recognized from FIG. 1 that a force F, which acts from left to right in the drawing and extends within the x-y plane, and which develops, for example, as a consequence of dynamic forces in an axle system of a motor vehicle, acts on the ball pivot 4. Based on the action of the force F, the ball shell 2 consisting of a viscoplastic polymer undergoes elastic deformation, as this is shown in FIG. 1 in a greatly exaggerated manner for the sake of better recognizability in a view that is not true to scale.

It can be recognized that the ball pivot 4 with the ball 3 is displaced to the right in the drawing relative to the joint housing 1 as a consequence of the action of force F. As a result, the side of the ball shell 2, which is the right-hand side in the drawing, is compressed at 11, whereas the side of the ball shell 2 that is the left-hand side in the drawing, is relieved at 12.

However, based on the approximate constancy of the volume or based on the Poisson's ratio of the material used for the ball shell 2, the increase in pressure on the right-hand side and the relief on the left-hand side of the ball shell 2 leads to a corresponding change in the dimension of the corresponding sides of the ball shell 2 in the vertical direction and in the z direction in the drawing. In other words, this means that the vertical dimension of the ball shell 2 increases on its right-hand side in the drawing, whereas the ball shell 2 tends to contract on the left-hand side, as this is indicated by the solid arrows 11, 12 drawn in broken line.

However, these changes in shape 11, 12 of the ball shell 2, which are caused by the force F, propagate to the sensor printed circuit board 6 because of the special clamping of the flexurally elastic sensor printed circuit board 6, as this can also be determined from the view in FIG. 1. It can be recognized that the sensor printed circuit board 6 is clamped in a scissor-like manner between the projection 13 of the ball shell 2, which projection is designed as a transmission means, on the one hand, and the spacer ring 14, which is in contact with the housing cover 5, on the other hand, such that forces or displacements introduced into the sensor printed circuit board 6 via the projection 13 of the ball shell 2 are converted into corresponding bending moments or lead to corresponding deflections of the sensor printed circuit board 6. Again, the deflection of the sensor printed circuit board 6 shown is not, of course, true to scale, but is shown in a greatly exaggerated manner for the sake of better recognizability.

In the ball and socket joint shown in FIG. 1, the sensor device 7 additionally also comprises, besides the vectorially operating magnetic field sensor and the electronic analysis unit, the sensors for detecting deflections or mechanical stresses on the surface of the sensor printed circuit board 6. By measuring the deflections or the mechanical stresses on the surface of the printed circuit board, it is thus possible to infer the value of the force F after a corresponding calibration of the sensor.

However, the sensor device 7 can be designed such that not only the amount of the deflection, but also the direction of the deflection or the direction of the bending moment causing the deflection in the x-y plane, i.e., in the plane of the sensor printed circuit board 6, can be determined. Since the changes in shape 11, 12 of the ball shell 2 as a function of the direction of the deforming force F reach their maxima in the same axial plane of the ball pivot 4 in which the deforming force F extends as well, the sensor printed circuit board 6 is also deformed in a characteristic manner as a function of the direction of the deforming force F.

This characteristic deformation can then be detected by means of the sensor device 7 in terms of both its amount and its direction in the x-y plane, so that it will in turn be possible to infer both the amount and the direction of force F in the x-y plane.

FIG. 2 shows again the ball and socket joint according to FIG. 1, where the ball and socket joint according to FIG. 2 is acted on by an axial force F', contrary to the view according to FIG. 1. It can be recognized that the deformation 11, 12 of the ball shell due to the deforming force F' is symmetrical and even uniform all around circumferentially in this case. This causes the sensor printed circuit board 6 to be arched uniformly in all directions via the circumferential projection 13, which acts as a means of transmitting the deformations of the ball shell 2 to the sensor printed circuit board 6. This is again shown in FIG. 2 on the basis of a greatly exaggerated deflection of the sensor printed circuit board 6, which is not true to scale.

Thus, when equal mechanical stress/strain or deformation of the sensor printed circuit board 6 is recorded by the sensor device 7 in both directions, this can be interpreted, depending on the instantaneously present boundary conditions, either as an axial compressive force F' or as a static prestressing/pretensioning force of the ball shell 2.

The boundary conditions to be taken into account here, which contribute to the interpretation of the measured force as a prestressing/pretensioning force, may be, for example, but by no means exclusively, the instantaneous relative positions of the ball pivot and the joint housing, which are indicative, for example, of a neutral position of a steering linkage, and/or stoppage of a motor vehicle; a more sustained constancy of force; or absence of motion of the ball and socket joint, which is likewise measured by means of the sensor array 7. In other cases, especially rapid fluctuations develop in the axial force determined or during simultaneously occurring, in-phase motions of the ball pivot, it can be inferred that the force is a variable force acting externally on the ball and socket joint.

Figure 2:
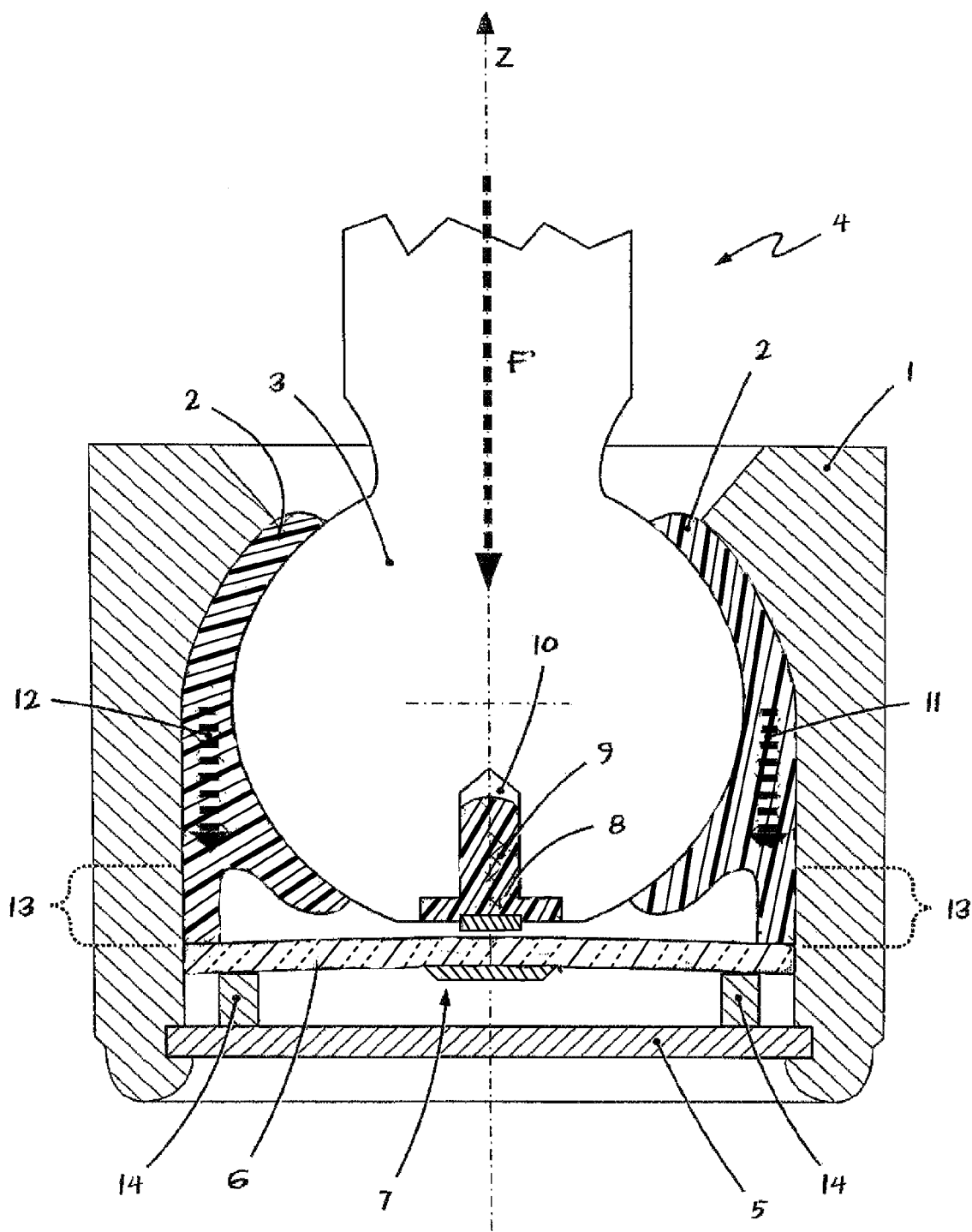
FIG. 2 is a schematic view of the ball and socket joint according to FIG. 1 with axial admission of forces in a representation and view corresponding to FIG. 1.
Figure 3:
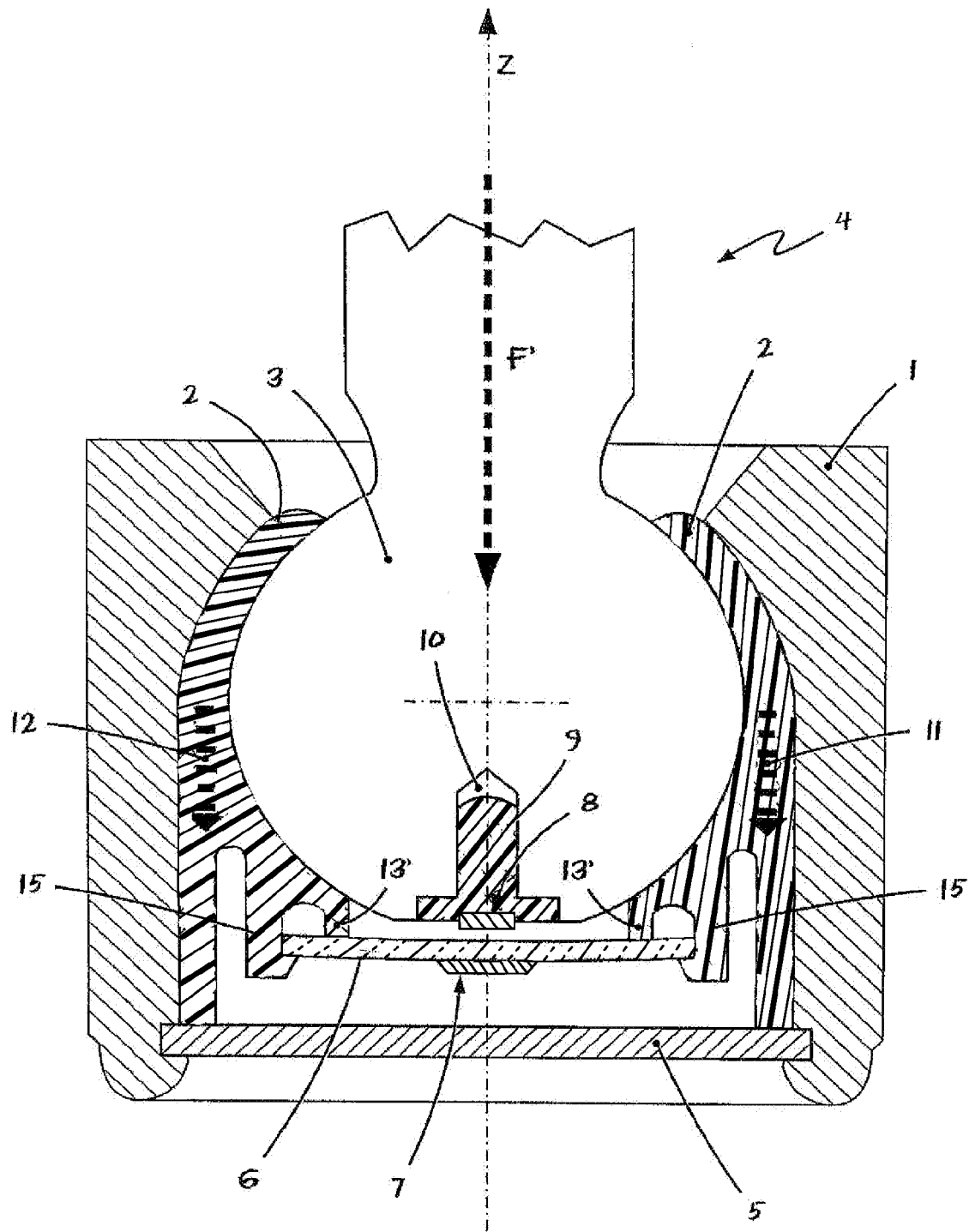
FIG. 3 is a schematic view of another embodiment of a ball and socket joint according to the present invention with axial admission of forces in a representation and view corresponding to FIGS. 1 and 2.

FIG. 3 shows another embodiment of a ball and socket joint according to the present invention. The ball and socket joint according to FIG. 3 corresponds essentially to the ball and socket joint according to FIG. 1 and FIG. 2. The difference between the ball and socket joint according to FIG. 3 and the ball and socket joint according to FIGS. 1 and 2 is that the sensor printed circuit board 6 is no longer arranged and clamped between a spacer ring 14 that is in contact with the housing cover 5 (see FIGS. 1 and 2) and the circumferential projection 13. The holding and transmission of the deformations of the ball shell 2 in the form of bending moments to the sensor printed circuit board 6 rather takes place in the ball and socket joint according to FIG. 3 by means of the circumferential projection 13' and the likewise circumferential locking projection 15, which is likewise arranged at the ball shell 2 itself.

This embodiment is characterized in that—especially as a function of the specifically selected geometry of the projections 13' and 15—an especially high response sensitivity of the sensor printed circuit board 6 and of the sensors 7 arranged thereon can be achieved, as a result of which a ball and socket joint with especially high measuring resolution in terms of the acting forces and/or in terms of the determination of the remaining prestressing/pretensioning force of the ball shell 2 in the ball and socket joint can be obtained.

It thus becomes clear as a result that thanks to the present invention, a ball and socket joint and a process for wear measurement on a ball and socket joint are provided, in which reliable detection of the operating and load state of the ball and socket joint becomes possible. The ball and socket joint according to the present invention makes it possible to determine forces and loads acting on the ball and socket joint at a low cost and in a reliable manner as well as with a great design-based degree of freedom. In addition, it is also possible to obtain reliable data on the state of wear of the ball and socket joint, so that a possibly imminent failure of the ball and socket joint can be recognized and prevented in time.

Thus, the present invention makes a valuable contribution to the improvement of safety, reliability and failure prevention in ball and socket joints as well as concerning the expansion of the data base of driver assistance systems, especially in case of use of ball and socket joints in the area of demanding axle systems and wheel suspensions on the motor vehicle.

While specific embodiments of the invention have been shown and described in detail to illustrate the application of the principles of the invention, it will be understood that the invention may be embodied otherwise without departing from such principles.

LIST OF REFERENCE NUMBERS

1 Joint housing
2 Ball shell
3 Joint ball
4 Ball pivot
5 Housing cover
6 Sensor printed circuit board
7 Sensor device
8 Magnetic field transducer
9 Plastic plug
10 Hole
11, 12 Change in shape
13, 13' Circumferential projection, transmission means
14 Spacer ring
15 Circumferential locking projection
F, F' External force

The invention claimed is:

1. A ball and socket joint for a motor vehicle, the ball and socket joint comprising:
a joint housing comprising a cover opening and a ball pivot opening having an interior space therebetween, said joint housing including a housing cover, said housing cover closing said cover opening;
a ball shell arranged in said interior space of said housing comprising an essentially circumferential projection which is in contact with said housing cover;
a ball pivot comprising a ball and a pivot stem, said ball being accommodated in said ball shell in a slidingly movable manner and said pivot stem extending through said ball pivot opening;
a flexurally elastic sensor printed circuit board held in said joint housing in a flexurally mobile manner, said elastic sensor printed circuit board engaging said ball shell by means of a locking projection arranged on said ball shell, wherein said sensor printed circuit board is fully suspended without contacting said housing or said housing cover, said elastic sensor printed circuit board being spaced from said housing cover by said circumferential projection;
a sensor device for determining forces or loads, said sensor device being arranged on said flexurally elastic sensor printed circuit board, wherein said sensor device measures deflections or mechanical stresses of said sensor printed circuit board; and
a transmission means for introducing a force or a bending moment into said sensor printed circuit board during a deformation of said ball shell, wherein said transmission means comprises said locking projection.

2. A ball and socket joint in accordance with claim 1, wherein said sensor printed circuit board is round.

3. A ball and socket joint in accordance with claim 1, wherein said sensor device measures an amount and a direction of deformation or deflection of said sensor printed circuit board.

4. A ball and socket joint in accordance claim 1, further comprising an angle sensor device with a field transducer arranged in the area of a surface of said ball, and a field sensor device arranged at or adjacent to said joint housing.

5. A ball and socket joint in accordance with claim 4, wherein said sensor device includes said field sensor device arranged together with a force sensor device on said sensor printed circuit board.

6. A ball and socket joint in accordance with claim 5, wherein said field sensor device and said force sensor device are designed in the form of a monolithically integrated circuit.

7. A ball and socket joint in accordance with claim 4, wherein said field sensor device is designed as a CMOS Hall sensor array.

8. A ball and socket joint in accordance with claim 4, wherein said field sensor device measures electro magnetic fields in all three directions of space.

9. A ball and socket joint in accordance with claim 1, wherein said circumferential projection comprises a first ball shell projection engaging said joint housing and said housing cover, and wherein said locking projection comprises a second ball shell projection having an inner side surface and a radially inward extending portion and a third ball shell projection having a top surface, said elastic sensor printed circuit board engaging said inner side surface, said radially inward extending portion and said top surface.

10. A ball and socket joint for a motor vehicle, the ball and socket joint comprising:

a joint housing comprising a cover opening and a ball pivot opening having an interior space therebetween, said joint housing including a housing cover, said housing cover closing said cover opening;

a ball shell arranged in said interior space of said housing comprising an essentially circumferential projection which is in contact with said housing cover;

a ball pivot comprising a ball and a pivot stem, said ball being accommodated in said ball shell in a slidingly movable manner and said pivot stem extending through said ball pivot opening;

a flexurally elastic sensor printed circuit board held in said joint housing in a flexurally mobile manner, said elastic sensor printed circuit board engaging said ball shell by means of a locking projection arranged on said ball shell, wherein said sensor printed circuit board is fully suspended without contacting said housing or said housing cover, said elastic sensor printed circuit board being spaced from said housing cover by said circumferential projection, said elastic sensor printed circuit board having a first surface and a second surface, said first surface being located opposite said ball, said second surface being located opposite said housing cover; and a sensor device for determining forces or loads, said sensor device being arranged on said second surface of said flexurally elastic sensor printed circuit board, said sensor device being located opposite said housing cover, wherein said sensor device measures deflections or mechanical stresses of said sensor printed circuit board, said locking projection of said ball shell transmitting a force or a bending moment into said sensor printed circuit board during a deformation of said ball shell.

11. A ball and socket joint in accordance with claim 10, wherein said circumferential projection comprises a first ball shell projection engaging said joint housing and said housing cover, and wherein said locking projection comprises a second ball shell projection having an inner side surface and a radially inward extending portion and a third ball shell projection having a top surface, said elastic sensor printed circuit board engaging said inner side surface, said radially inward extending portion and said top surface.

12. A ball and socket joint in accordance with claim 11, wherein said first ball shell projection is located at a spaced location from said second ball shell projection and said third ball shell projection, said third ball shell projection being located at a spaced location from said second ball shell projection and said first ball shell projection.

13. A ball and socket joint in accordance with claim 12, wherein said first ball shell projection, said second ball shell projection and said third ball shell projection extend in an axial direction.

14. A ball and socket joint in accordance with claim 11, wherein said first ball shell projection is substantially parallel to said second ball shell projection and said third ball shell projection.

15. A ball and socket joint in accordance claim 11, further comprising an angle sensor device with a field transducer arranged in an area of a surface of said joint ball, and a field sensor device arranged at or adjacent to said joint housing.

16. A ball and socket joint in accordance with claim 11, wherein said sensor device measures an amount and a direction of deformation or deflection of said sensor printed circuit board.

17. A ball and socket joint in accordance with claim 15, wherein said field sensor device measures electro magnetic fields in all three directions of space.

* * * * *